R. LANGE.
SAFETY HOOK.
APPLICATION FILED SEPT. 20, 1910.
1,010,270.
Patented Nov. 28, 1911.
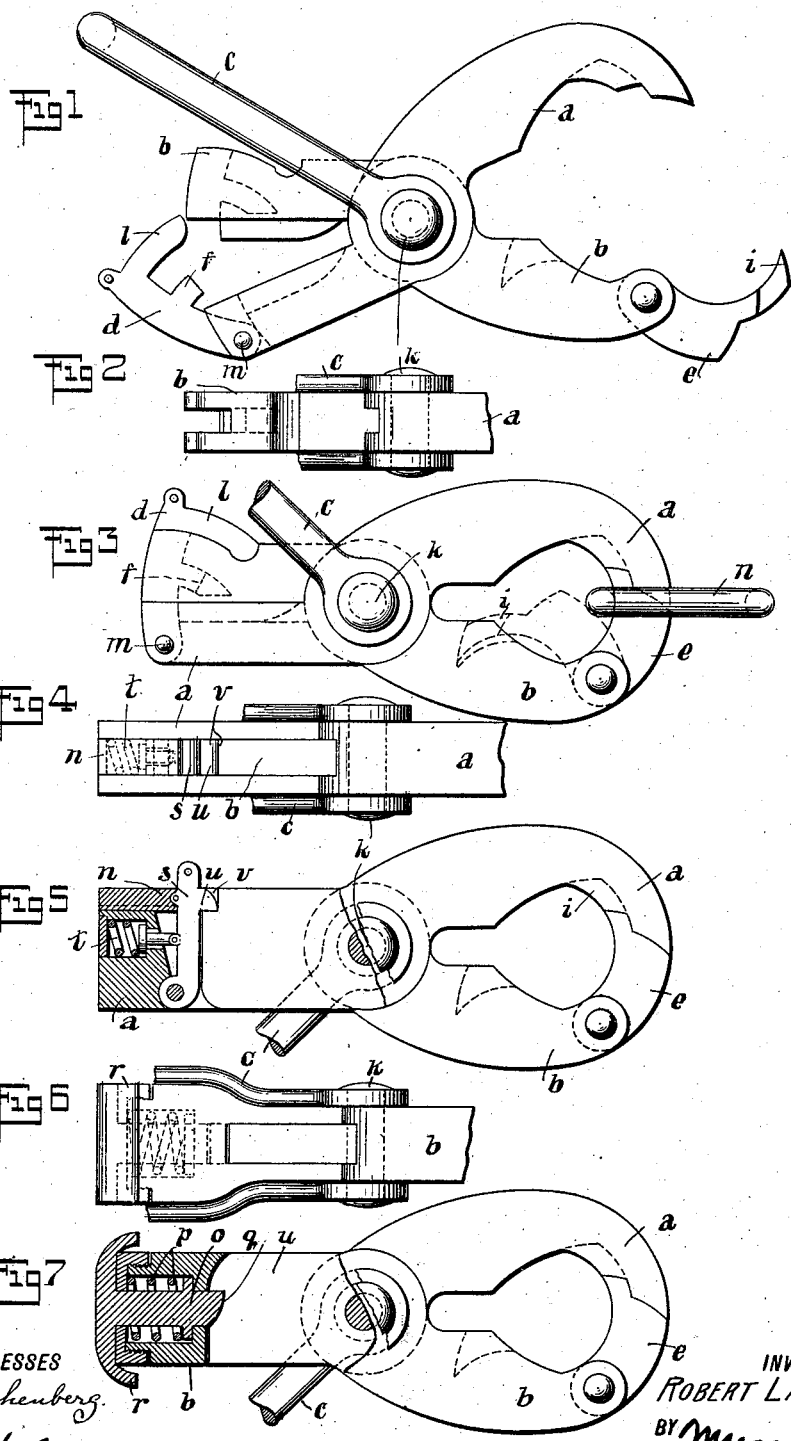
WITNESSES
C. J. Hachenberg
C. E. Holske
INVENTOR
ROBERT LANGE,
BY
ATTORNEYS (No Model Outputs)

UNITED STATES PATENT OFFICE.

ROBERT LANGE, OF CHARLOTTENBURG, GERMANY.

SAFETY-HOOK.

1,010,270.  Specification of Letters Patent.  Patented Nov. 28, 1911.

Application filed September 20, 1910. Serial No. 582,942.

*To all whom it may concern:*

Be it known that I, ROBERT LANGE, a subject of the Emperor of Germany, and a resident of Charlottenburg, Germany, have invented a new and Improved Safety-Hook, of which the following is a full, clear, and exact description.

The invention is an improvement in safety hooks, and has in view such a device adapted to carry the loads of cranes, or used as a harness hook or other readily-releasable connecting device suitable for carrying a load or resisting a strain.

To this end the hook in general comprises two hook members pivoted together to swing to and from each other, one of the hook members having a gate adapted, when the hook members are closed and locked, to swing inwardly and permit the insertion and removal of the suspension link, the gate arranged at the mouth of the hook to take the strain on the link.

Reference is to be had to the accompanying drawings forming a part of this specification, in which similar characters of reference indicate corresponding parts in all the views.

Figure 1 is a side view of a hook constructed in accordance with my invention, showing the hook members released and swung apart. Fig. 2 is a fragmentary sectional edge view of the same; Fig. 3 is a view similar to Fig. 1, showing the hook members closed, the gate being shown in full lines in closed position, and in dotted outline in open position; Fig. 4 is an edge view similar to Fig. 2, showing a modified form of lock for the hook; Fig. 5 is a side view of the hook, partly in longitudinal section, with the lock applied as shown in Fig. 4; Fig. 6 is a view similar to Fig. 4, showing a further modification of the hook lock; and Fig. 7 is a view similar to Fig. 5, with the lock as shown in Fig. 6, applied.

In all of the forms of the invention illustrated, two levers, $a$ and $b$ are provided, the levers being crossed and pivotally connected together by a pin $k$, to the ends of which, as shown in Fig. 2, is attached a bail $c$, of sufficient extent to swing about the inner ends of the levers. The outer portions or arms of the levers constitute oppositely-arranged hook members adapted to swing to and from each other on the pivot $k$, one of the members having a gate $e$ which is arranged at the mouth of the hook, where it will take the strain of the load carried by the link or loop $n$. The gate is adapted to swing inwardly of the hook when the hook members are brought together, and is provided at the free end with a tongue $i$ of reduced width and thickness, adapted to be received and seat in a correspondingly-shaped recess formed in the inner face of the other hook member $a$, the hook member $b$ being shown to be provided with a recess to receive the point of the tongue when the gate is thrown inwardly to the dotted position shown in Fig. 3, as when applying the link $n$.

The gate feature of the hook is common to all of the forms of the invention illustrated, and with the levers $a$ and $b$ requires only a suitable lock for securing the hook members in closed position. I have shown a number of forms of such a lock, that shown in Figs. 1 and 2 comprising an approximately F-shaped locking lever $d$, which is fulcrumed at its lower end to one of the hook levers and adapted to swing into engagement with the other hook lever. For this purpose, the said lever is constructed to receive the portions $l$ and $f$ of the locking lever, the portion $f$ passing into an arcuate recess formed in the hook lever, and the portion $l$ engaging the outer curved surface thereof. By this arrangement, when the load is on the hook, and for some reason it is desired to instantly release it, the locking lever $d$ is brought back to a released position, either directly by hand or by an attached cable passing to a suitable point of operation. Upon the release of the hook levers, the hook members separate under the load and allow the gate $e$ to swing outwardly and release the link.

In the form of lock shown in Figs. 4 and 5, the locking lever $s$ is fulcrumed to one of the hook levers and has a catch $u$ at its forward edge, arranged to engage in a recess $v$ of the other hook lever. The locking lever $s$ is forced forwardly by a spring piston $t$. On the hook lever to which the locking lever $s$ is fulcrumed is a slide $w$, to which the locking lever is connected.

In the form of the lock shown in Figs. 6 and 7, one of the hook levers has a spring-pressed bolt $o$, pressed forwardly and adapted to engage in a recess $q$ formed in the other hook lever, the bolt being suitably guided in the lever and provided with an operating member $r$.

In all forms of the lock it will be noted that the same can be released by drawing the locking member rearwardly or in a direction against the action of the load or strain, which makes it convenient to work the lock from a distant point by a cable. The load-carrying or suspension link *n* can be easily and readily applied to the hook and removed while the hook levers are locked. Thus, in the application of the link the gate is swung inwardly and slipped back on the lever *a* until the gate is again swung to its seat, in which position of the gate it is adapted to take the strain of the link and be held thereby in operative position. The tongue of the gate prevents any lateral play between the hook members, and further prevents the gate from swinging inwardly from its seat when the link is drawn about to uncover the gate proper but overlie the tongue.

Having thus described my invention, I claim as new and desire to secure by Letters Patent:

1. A safety hook, comprising two levers having hook members at one end and pivoted together intermediate of their ends, means for locking the levers together with the hook members in closed position, and a gate for carrying the load of a connecting link, pivoted to one of the hook members and adapted to seat against the inner face of the other hook member, said gate being adapted to swing inwardly from its seat while the hook members are closed to permit of the introduction or removal of the said link.

2. A safety hook, comprising two levers having hook members at one end and pivoted together intermediate of their ends, one of the hook members having a recess in its inner face, a gate pivoted to the other hook member and provided with a tongue adapted to seat in the said recess, and means for locking the levers together with the hook members in closed position.

3. A safety hook of the class described, comprising levers pivoted together intermediate of their ends, the outer arms of the levers being formed into hook members, a gate pivoted to one hook member to swing inwardly and adapted to seat against the inner face of the other hook member, a locking device carried by one of the inner arms of the levers and adapted to engage the other arm to lock the hook members closed, and a bail mounted upon the pivot of said levers.

4. The combination of crossed levers pivoted together intermediate of their ends, the arms of said levers at one side of the pivot in the form of hook members, a gate fulcrumed to one of the hook members and adapted to seat against the inner side of the other hook member when the hook members are closed, the gate adapted to swing inwardly when the hook members are closed, and open the mouth of the hook, and adapted to swing outwardly to a releasing position when the hook members are open, and a locking arm pivoted to the arm of one lever and provided with projections, one engaging a recess and the other the outer surface of the other lever to hold the hook members closed.

In testimony whereof I have signed my name to this specification in the presence of two subscribing witnesses.

ROBERT LANGE.

Witnesses:
 HENRY HASPER,
 WOLDEMAR HAUPT.

Copies of this patent may be obtained for five cents each, by addressing the "Commissioner of Patents, Washington, D. C."